(12) United States Patent
Casey et al.

(10) Patent No.: US 8,832,804 B1
(45) Date of Patent: Sep. 9, 2014

(54) PASSWORD PRE-VERIFICATION IN CLIENT-SERVER APPLICATIONS

(75) Inventors: Matthew R. Casey, San Francisco, CA (US); Girts Folkmanis, San Francisco, CA (US); John Mishanski, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/204,390

(22) Filed: Aug. 5, 2011

(51) Int. Cl.
*G06F 21/00* (2013.01)
(52) U.S. Cl.
USPC .................. 726/5; 705/18; 704/273; 704/275; 715/773
(58) Field of Classification Search
USPC ............. 726/5, 1; 705/18; 704/273, 275, 231; 715/773
See application file for complete search history.

(56) References Cited

U.S. PATENT DOCUMENTS

| | | | |
|---|---|---|---|
| 5,887,131 A | 3/1999 | Angelo | |
| 6,064,736 A | 5/2000 | Davis et al. | |
| 6,292,782 B1* | 9/2001 | Weideman | 704/273 |
| 2007/0006279 A1* | 1/2007 | Brown et al. | 726/1 |
| 2007/0199054 A1* | 8/2007 | Florencio et al. | 726/5 |
| 2009/0164354 A1 | 6/2009 | Ledbetter et al. | |
| 2012/0110493 A1* | 5/2012 | Cabral | 715/773 |

OTHER PUBLICATIONS

Rabiner, L.; "Applications of voice processing to telecommunications"; Proceedings of the IEEE;vol. 82 , Issue: 2; Digital Object Identifier: 10.1109/5.265347;Publication Year: 1994 , pp. 199-228.*

Cox, R.V. ;et al. ;"On the applications of multimedia processing to communications"; Proceedings of the IEEE; vol. 86 , Issue: 5; Digital Object Identifier: 10.1109/5.664272;Publication Year: 1998 , pp. 755-824.*
Abstract, "Methods for Protecting Password Transmission" by Mohammad Peyravian et al. of IBM Corporation, Computers & Security, vol. 19, Issue 5, published Jul. 1, 2000, 466-469 pgs.
Abstract, "Weaknesses of Lee-Li-Hwang's hash-based password authentication scheme" by Wei-Chi Ku, et al., ACM SIGOPS Operating Systems Review, vol. 37, Issue 4, Oct. 4, 2003, 2 pgs.
Abstract, "Weaknesses of Yoon-Ryu-Yoo's hash-based password authentication scheme", Wei-Chi Ku, et al., ACM SIGOPS Operating Systems Review, vol. 39, Issue 1, Jan. 1, 2005, 1 pg.
Ross, et al., "Stronger Password Authentication Using Browser Extensions", Proceedings of the 14th USENIX Security Symposium, Jul. 31-Aug. 5, 2005, 22 pgs.
Abstract, "Local Authentication with Bluetooth enabled Mobile Devices" by Tahiti Papeete, University of Rome, Italy, Oct. 23-28, 1 pgs.
Abstract, "A remote user authentication scheme using hash functions" by Cheng-Chi Lee, et al., ACM SIGOPS Operating Systems, vol. 26, Issue 4, Oct. 2002, 1 pg.

* cited by examiner

*Primary Examiner* — Hadi Armouche
*Assistant Examiner* — Angela Holmes
(74) *Attorney, Agent, or Firm* — Fox Rothschild LLP

(57) ABSTRACT

A computer implemented system and method are provided for password pre-verification on the client side in client-server applications. An example system comprises a translation module configured to translate user input, in the form of a character string that can represent a password, to obtain a symbolic representation of the user input. The example system also comprises an output module configured to receive the symbolic representation from the translation module and, based on the user input, provide output to the user in the form of visual, audio or haptic cues. Such cues can alert a user as to whether or not the input character string is correctly entered. In a further example embodiment, a system can further comprise a comparison module configured to compare an existing symbolic representation with the symbolic representation generated from the user input by the translation module.

26 Claims, 5 Drawing Sheets

User ID: [                    ]

Password: [                    ]

FIG.5A

User ID: [ Example123         ]

Password: [ •                  ]

FIG.5B

User ID: [ Example123         ]

Password: [ ••                 ]

FIG.5C

User ID: [ Example123         ]

Password: [ •••////////////////]

FIG.5D

User ID: [ Example123         ]

Password: [ ••••///////////////]

FIG.5E

User ID: [ Example123         ]

Password: [ •••••//////////////]

FIG.5F

PASSWORD PRE-VERIFICATION IN CLIENT-SERVER APPLICATIONS

BACKGROUND OF THE INVENTION

1. Field

This disclosure relates to security and password authentication.

2. Background Art

User authentication is often implemented as an entry form for the input of a username and password. When the form is submitted, both username and password are typically sent to a server. The server then validates the username and password combination and either grants the user access or presents the user with an incorrect password notification. In the latter situation, the user must try again. To be reasonably secure, passwords or passphrases must be fairly long (often including eight or more characters).

Password entry fields are typically masked with an asterisk or other character (e.g., circle) to prevent others who can see the screen from obtaining the password. This added measure of security, unfortunately, masks typing errors that can arise when entering a password. When a username and password is entered and submitted it often takes a significant amount of time for the browser or other client application to send a request and receive the result. This time can be particularly long on mobile devices where network latency can be high. If the password is incorrectly typed, the user has to start all over again.

BRIEF SUMMARY OF THE INVENTION

Computer implemented systems and methods are provided for password pre-verification on the client side in client-server applications. An example system comprises a translation module configured to translate user input, in the form of a character string that can represent a password, to obtain a symbolic representation of the user input. The example system also comprises an output module configured to receive the symbolic representation from the translation module and, based on the user input, provide output to the user in the form of visual, audio or haptic cues. In one feature, such cues can change as each character is input, so that the visual, audio or haptic cues alert a user as to whether or not the input character string is correctly entered. In a further example embodiment, a system can further comprise a comparison module configured to compare an existing symbolic representation with the symbolic representation generated from the user input by the translation module. In further example embodiments, the system may further comprise a translation module that comprises a hash function configured to translate user input into a symbolic representation.

Further features and advantages as well as the structure and operation of various embodiments are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings which are incorporated herein and form a part of the specification illustrate the present invention and together with the description further serve to explain the principles of the invention and to enable a person skilled in the pertinent art(s) to make and use the invention.

FIG. 1 schematically illustrates a system that enables password pre-verification on the client side in client-server applications.

FIGS. 5A-5F illustrate the output of a system with a graphical user interface showing a password box that visually changes as each character of a password is typed, starting with the third character.

DETAILED DESCRIPTION OF THE INVENTION

Figure 1:
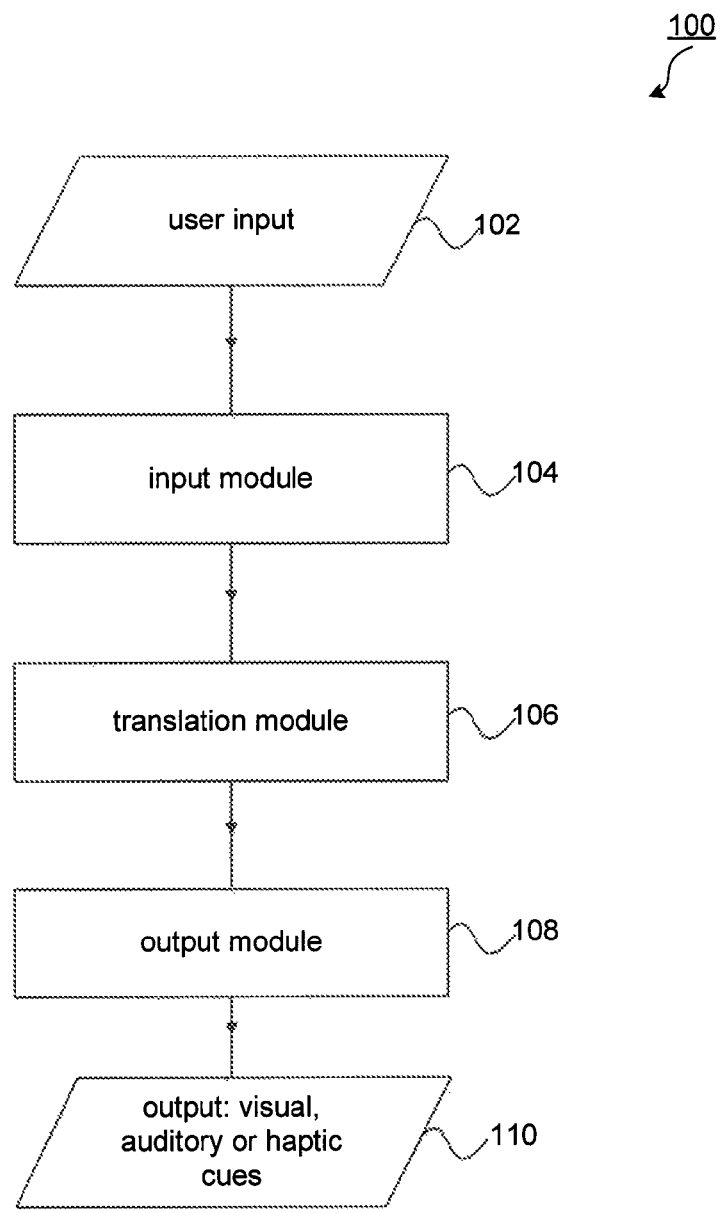

This disclosure provides systems and methods to enable a password to be pre-verified on a client before the password is sent to a server for complete verification. According to a feature, systems and methods are provided which enable password pre-verification on the client side during password entry so as to reduce round trip time and password reentry in the case of an error. This allows users to correct typing errors without incurring network delay and without having to restart password entry from scratch.

This disclosure provides multiple embodiments to enable passwords to be verified on the client side. As such, they provide cues to the user that he or she is either entering the password correctly or incorrectly before the password is sent to the server. Embodiments can be classified according to at least two groups. In the first group verification is accomplished using only the password. In the second group verification is made by comparing a symbolic representation of the input password with an existing symbolic representation.

Reference in this specification to "one embodiment," "an embodiment," "an example embodiment," etc., indicate that the embodiment described may include a particular feature, structure or characteristic, but not every embodiment may necessarily include the particular feature, structure or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure or characteristic in connection with other embodiments whether or not explicitly described. Embodiments will be described with reference to the accompanying figures.

First Approach: Pattern Recognition of Password Portions

This approach does not require keeping any state or sending any intermediate information between a client and server during the login process. In this approach, the client-side login form or application provides a method to derive a visual or other signal from the currently entered password. For example, as a user enters a password in a password entry box, the background color or other visual indicator such as texture of the box may change. The color or visual texture can depend on the characters entered so far. For enhanced security, it may be advantageous to have no changes occur until several characters are entered. In an example, the password box may appear to not change until the third character is input. Upon entry of the third character, the background color or texture of the password entry box may change from a first color or texture to a second color or texture. Upon entry of the fourth character, the background color or texture may change from the second color or texture to a third color or texture. Upon entry of the fifth character, the background color or texture may change from the third color or texture to a fourth color or texture, etc.

In further example, the changing visual appearance of the background of the password entry box may follow other patterns. For example, there may be no change until the third character is entered. Upon entry of the third character, the background color or texture may change from a first color or texture to a second color or texture. Then the background may appear to not change again until several more characters are input. For example, after the color or texture change that occurs upon entering the third character the background may not change again until the fifth character is entered upon which, the background color or texture may change from the second color or texture to a third color or texture.

According to examples as described above, each time the full password is entered, the final resulting color or texture will always be the same if the password is typed correctly. This gives the user some confidence that the password is entered correctly. Similarly over time, the user learns the pattern of changing colors or textures and becomes able to detect when the pattern deviates and thus when an error has been made.

The visual cues do not have to be limited to color. Any graphical representation that the user can easily learn and distinguish can be employed as long as it does not give an unauthorized observer of the screen enough information to discover the password. A potential method could be to show something similar to the ASCII graphic representation of an SSH key. A more user friendly approach could be to choose between different graphical icons based on a hash value corresponding to a typed character string. Alternatively, the system can algorithmically manipulate a graphical object based on a hash value, for example a dancing stick figure.

Hash values are obtained from a hash function. A hash function is any well-defined procedure or mathematical function that converts a large, possibly variable-sized amount of data into a small datum, usually a single integer that may serve as an index to an array.

Second Approach: Verification of Password Portions

This approach requires the client to have some knowledge about the password being entered. This knowledge must be sufficient to validate the password with reasonable probability but must not sufficiently weaken the security of the password. An example of such knowledge could be a small hash of the password such as the first byte of some cryptographic hash function applied to the password. It is preferable to use a hash rather than storing the actual password on the client for increased security. Using the small hash, the login page or client application can verify that the hash corresponds to the password being entered.

In this example, a hash value can be generated for each character string that arises as a user enters a password character by character. For example, a user enters the first character of the password that gives rise to a one-character string. The hash function may generate a symbolic representation of this one-character string in the form of a first hash value. Entry of the second character gives rise to a two-character string. The hash function may generate a symbolic representation of this two-character string in the form of a second hash value. Entry of the third character gives rise to a three-character string. The hash function may generate a symbolic representation of this three-character string in the form of a third hash value. In general, a full password is an n-character string where n is a positive integer. In this example, the full n-character string gives rise to a sequence of n hash values, each one being generated with the entry of each successive character of the password.

Each successive input character gives rise to a corresponding hash value. A password typing error can be signaled to the user if the final generated value in the sequence of n hash values disagrees with a corresponding stored hash value.

The results of the verification can be displayed to the user. The login page or application can then prevent the password from being submitted if the final value in the sequence of n hash values does not match the corresponding stored hash value. Some override mechanism can also be used to allow submitting a password in a case of hash sequence mismatch. A hash sequence mismatch can occur, for example, in a situation in which the password was changed on the server from a different application.

The logic of this second approach is as follows. If the result of checking the small hash is negative then it is guaranteed that entered password is incorrect so that the user is notified immediately without waiting for full verification from the server. A negative result occurs if there is a mismatch between the final generated hash value and the corresponding stored hash value. If the comparison is positive, then it is very likely that the password is correct and the password is sent to the server for full verification.

The sequence of hash values can either be delivered to the client during the login process or alternatively can be stored on the client. If the hash value sequence is to be stored on the client, the first login would have to be made without verification. If the login is successful, the hash value sequence can be stored locally. For example, in the case of a web page, the storage can be done by the page itself, for example, by using JavaScript™ to store cookies in the browser.

This second method can also be implemented entirely by a web browser, thus removing the need for a website to support such a feature. This would be similar to, but more secure than, the "auto-fill" feature in which a web browser remembers entire passwords. In this case the browser would not store the entire password, but rather, would only store the small hash.

Alternatively, an existing symbolic representation such as a hash can be delivered from a server to the client during password entry. For example, once the client enters the username an asynchronous call could be made to request delivery of a symbolic representation. The server would then retrieve the hash value associated with the user and return it to the client. When a hash value is requested for a username that does not exist, a hash value can still be returned. This would prevent an attacker from determining which users exist on a system. The hash value returned can be chosen to be deterministic so that multiple requests for a hash value associated with a single nonexistent username would result in the same hash value. Once the client receives the hash value, it can use the value to verify the password and present the verification results to the user.

Different methods can be used to reduce the ability for an attacker to deduce information about a user's password. For example, the server can send a correct hash after the user enters a few characters correctly, otherwise it can send back an incorrect but deterministic value.

Example Embodiments

FIG. 1 illustrates an example system 100 that provides password pre-verification. The system comprises an input module 104, a translation module 106, and an output module 108. The input module 104 accepts user input 102 in the form of a character string that can represent a password. Typically, a user types the character string as input. The input string may be represented, for example, as ASCII characters. The translation module 106 takes input from the input module 104 and translates it into a symbolic representation of the user input. In example embodiments, a hash function can be used to translate the user input to a symbolic representation. The output module 108 takes the symbolic representation from the translation module 106 and produces cues to the user 110.

As an example, visual cues can be given to the user. In other examples audio or haptic cues can be given to the user. An example of visual cues could be the color of the password box that changes with each typed character. The sequence of changing colors can correspond to the sequence of characters typed. There is no need to compare the sequence of characters typed in order to produce visual cues. A user could recognize the sequence of colors or at least the final color and have an idea whether or not the password was correctly typed. An example of a haptic cue would be a characteristic vibration of the device that may be used to cue a visually impaired person. Further description of generation of symbolic representation of user input as it is entered and its translation into sequences of output cues recognizable to a user are described even further below with respect to a method shown in FIG. 3 and an example output display sequence shown in FIG. 5.

In example embodiments, the input module 104 can be configured to receive user input from a physical or on-screen keyboard. In other examples, the input module 104 can be configured to receive user input from a speech recognition device configured to receive user input that is spoken. In other examples, the output module 108 can be configured to output a graphical representation such as a character that changes its configuration and predictable ways. An example may be a dancing stick figure.

Password pre-verification system 100 may be implemented on or implemented with a computing device. For example, system 100 including its constituent modules 104, 106, and 108, may be implemented in software, firmware, or hardware or any combination thereof in a computing device. A computing device can be any type of computing device having one or more processors. For example, a computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A computing device may include a communication port or I/O device for communicating over wired or wireless communication link(s).

Figure 2:
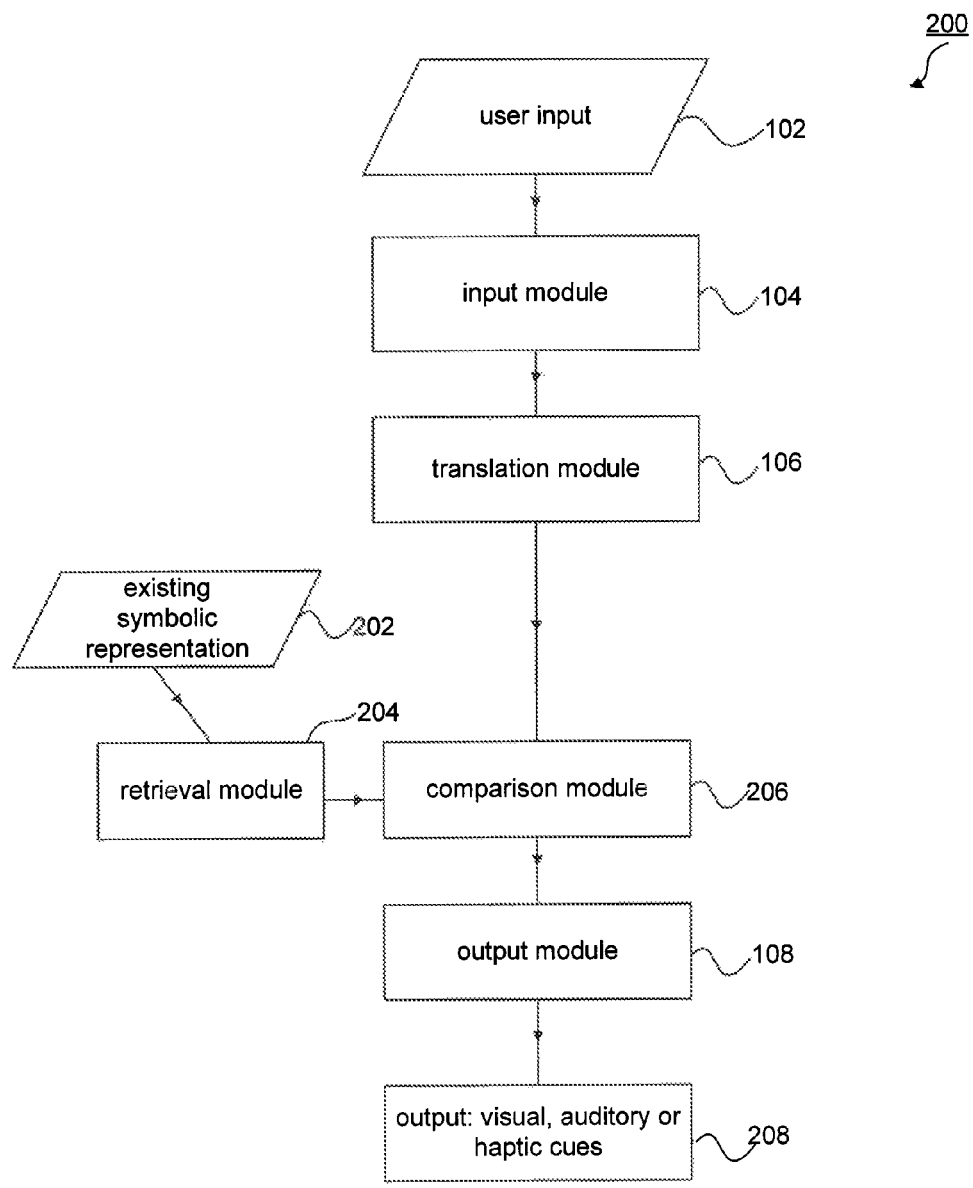
FIG. 2 is an illustration of an example system that enables password pre-verification further comprising a comparison module.

FIG. 2 illustrates a further example system 200 that provides password pre-verification. System 200 includes input module 104, translation module 106, retrieval module 204, comparison module 206, and an output module 108. In this example embodiment, the input module 104 takes user input 102 that may be a character string that represents a password. The input module provides input to a translation module 106 that creates a symbolic representation of the user input. As an example, translation module 106 may use a hash function configured to translate user input to a symbolic representation. The symbolic representation can be a hash value corresponding to a typed character string. A character string of length one corresponds to the first typed character of the password. A character string of length two corresponds to the first two typed characters of the password, etc. Further description of the hash function to generate a symbolic representation of user input as it is entered is described below with respect to a method shown in FIG. 4. This example system also comprises a comparison module 206 and a retrieval module 204 to retrieve an existing symbolic representation 204 for comparison. Comparison module 206 compares an existing symbolic representation 202 (e.g., the final hash value of the sequence) with the symbolic representation generated by translation module 106 corresponding to the input character string. The result of the comparison that is generated by the comparison module 206 is then fed to the output module 108 which generates cues to the user 208, such as visual, auditory, and/or haptic cues. Further description of generation of symbolic representation of user input as it is entered and its translation into sequences of output cues recognizable to a user using additional comparison are described below with respect to a method shown in FIG. 4 and an example output display sequence shown in FIG. 5.

As with the system illustrated in FIG. 1, the input module 104 may be configured to receive input from a physical or on-screen keyboard. It may also be configured to receive user input 102 from a speech recognition device configured to receive user input that is spoken. Also as with the system of FIG. 1, the output module 108 may be configured to provide output to the user in the form of a sequence of colors or textures determined by the user input character string. It may alternatively be some form of graphical representation wherein the content of the graphical representation is determined by the user input string. An example would be a stick figure character that dances in a particular way if the password is input correctly and dances in a different way if the password is incorrectly input.

Password pre-verification system 200 may be implemented on or implemented with a computing device. For example, system 200 including its constituent modules 104, 106, 108, 204, and 208 may be implemented in software, firmware, or hardware or any combination thereof in a computing device. A computing device can be any type of computing device having one or more processors. For example, a computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A computing device may include a communication port or I/O device for communicating over wired or wireless communication link(s).

Figure 3:
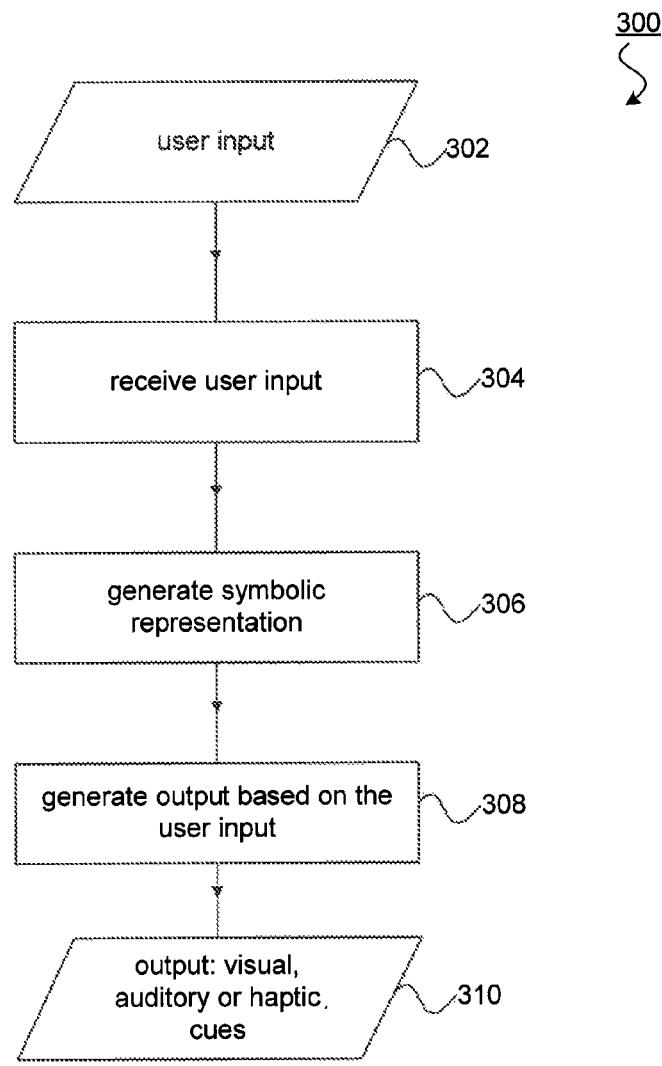
FIG. 3 is a schematic illustration of a method of enabling password pre-verification.

FIG. 3 illustrates a computer implemented method for password pre-verification as might be carried out using a system as illustrated in FIG. 1. In this method there is no need to compare the user input string with an existing string because output cues are generated simply based on the content of the input string and it is up to the user to determine if the output cues correspond to a correctly type password. In this method, password pre-verification is implemented by first receiving 304 input 302. Next a translation module is used to translate user input 302 in the form of a character string that can represent a password, to obtain a symbolic representation 306. These steps are followed by using an output module to receive symbolic representation from the translation module to generate output 308 based on the user input in the form of visual, audio, and/or haptic cues 310.

For example, a user may enter a password as an n-character string one character at a time. Thus upon receiving 304 the first character of the user input 302 a symbolic representation may be generated 306 corresponding to the one-character string that is input. For example, a hash function may be used to generate a first hash value. Output may be generated 308 based on the hash value. For example, a first color or texture of the background of the password entry box may be assigned to the particular hash value that is generated upon entering the first character. In the next stage, upon receiving 304 the second character of the user input 302 a symbolic representation may be generated 306 corresponding to the two-character string that is input. For example, a hash function may be used to generate a second hash value. Output may be generated 308 based on the second hash value. For example, a second color or texture of the background of the password entry box may be assigned to the particular hash value that is generated upon entering the second character. This method can then be continued for the third, fourth, fifth, etc. character entered ending with the n-character string corresponding to the complete password.

Figure 4:
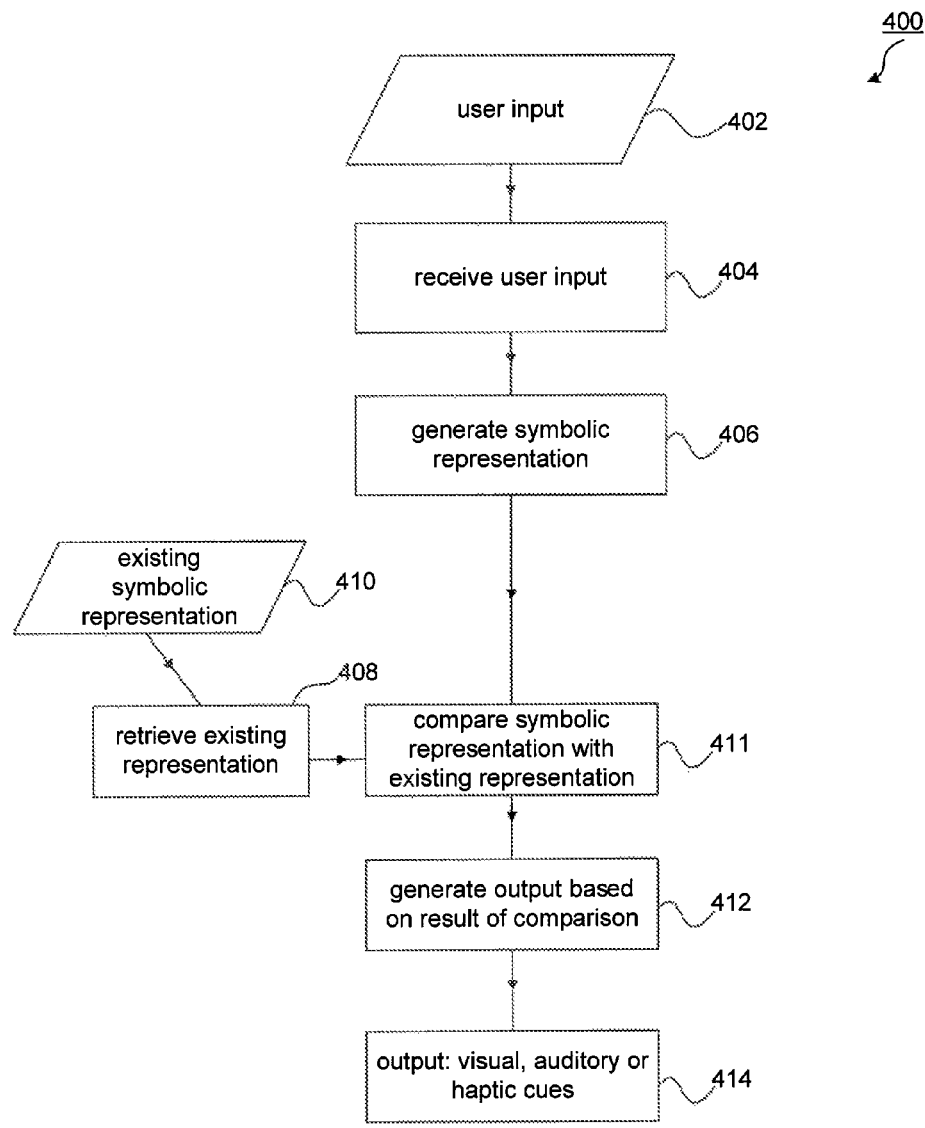
FIG. 4 illustrates a method of enabling password pre-verification including comparing a symbolic representation with an existing symbolic representation.

FIG. 4 illustrates a computer implemented method of password pre-verification that might be carried out, for example using a system as described in FIG. 2. This method comprises using a translation module to translate user input 402 that is received 404 using some input device to generate a symbolic representation 406. As described above, the symbolic representation can be a sequence of n hash values corresponding to the one-character, two-character, etc. up to n-character strings arising as the password is input character by character. The symbolic representation is then compared 411 with an existing symbolic representation that is retrieved 408 using a retrieval module and compared with the existing symbolic representation 410 to generate an output 412 based on the comparison. As discussed previously, the output 414 can be in the form of visual, auditory, and/or haptic cues. In this example method, the existing symbolic representation can be either stored locally on the client side or can be retrieved from the server side. The existing representation can be a sequence of n hash values as described above.

FIGS. 5A-5F illustrate the operation of an example system that enables password pre-verification as it might appear to a user. FIG. 5A presents a typical pair of user ID and password entry boxes before any information is entered. FIG. 5B illustrates the situation after a user ID "Example 123" has been entered in the user ID box and a first character of the password has been entered in the password entry box. The first character entered is obscured by a circle symbol. FIG. 5C shows the situation after the second character of the password has been entered in the password entry box. Like the first character entered, the second character is obscured by a circle symbol. At this point nothing has changed with the visual appearance of the password entry box.

FIG. 5D shows that upon entering the third character the visual appearance of the password entry box has changed. FIG. 5D shows the password entry box with a visual texture in the form of diagonal lines slanting to the left from top to bottom. Rather than a visual texture, as shown in FIG. 5D, upon entering the third character, the password entry box can change from a first color to a second color.

FIG. 5E shows the situation after the fourth character has been entered. Upon entry of the fourth character, the visual appearance of the password entry box changed again. FIG. 5E shows the password entry box with a visual texture in the form of diagonal lines slanting to the right from top to bottom. Rather than a visual texture, as shown in FIG. 5E, upon entering the fourth character, the password entry box can change from the second color to a third color.

Upon entry of the fifth character, the visual appearance of the password entry box changed again. FIG. 5F shows the password entry box with a visual texture in the form of horizontal and vertical cross-hatched lines. Rather than a visual texture, as shown in FIG. 5F, upon entering the fifth character, the password entry box can change from the third color to a fourth color.

Whether the password is correctly typed or not can be determined by the user based on the sequence of colors or visual textures. In practice, the user need not memorize the actual sequence of colors or textures but only the final color or texture. If the final resulting color or texture after typing the password is not what the user is used to, it is quite probable that the user has typed the password incorrectly. The user can therefore delete the password and type it again, until the correct color sequence is matched. Thus, the visual cues in this example would alert the user to whether or not the password is correctly typed. Once the user is confident that the password is correctly typed, they can submit the password to the server for verification.

In order to increase the security of the algorithm embodiments may be configured so that the box does not change colors for the first few letters. Such an approach would reduce the chance that an attacker could guess the first character of the password. As mentioned previously, the colors or textures that are most useful are the ones that result at the end of typing the password.

In further example embodiments, visual cues can be given to the user that don't involve colors. For example, instead of the password being obscured by a star ("*") or circle character, as shown in FIGS. 5A-5F, a different set of text characters could appear with each character that is typed. In order to increase security, all of the characters appearing on the screen could change as each new character is typed. In other words, each new symbol could be based on the characters entered so for. Thus after entering the character string "foo", the text box could display ".*%". The whole field could change after each character entered. Thus adding "d" to make the character string "food" could turn the textbox into ")!;>". In such an embodiment, the number of characters entered still corresponds with the number of characters displayed. However, more information would be displayed in the space previously occupied with just "*" symbols (or circles as shown in FIGS. 5A-5F).

The embodiments described above have centered on the use of a hash function to generate the symbolic representation. In other embodiments, translation module 106 can use another function besides a hash function to generate a symbolic representation. Another example would be the use of a "Bloom Filter." A Bloom Filter is a space-efficient probabilistic data structure that is used to test whether an element is a member of a set. False positives are possible, but false negatives are not. A Bloom Filter can be seeded with the real password and, for example, 199 other random passwords. Then when the user enters his or her password it would be checked against the Bloom Filter. If the result is positive, the probability of entering a correct password would be very high. If the result is negative, it is guaranteed that the entered password is incorrect. Adding a collection of other random passwords makes it more difficult for an attacker to guess the correct password by brute force trial and error based on the knowledge of Bloom Filter contents and hash functions.

The components or modules of FIGS. 1-5 including modules 104, 106, 108 204, and 206 may be implemented in one or more computer systems using hardware, software, firmware, tangible computer readable media having instructions stored thereon, or a combination thereof and may be implemented in one or more computer systems or other processing systems.

Typically, computer instructions are executed using one or more processors and can be stored in non-volatile storage medium or memory devices. Processors may include any conventional or special purpose processor, including, but not limited to, digital signal processors (DSP), field programmable gate arrays (FPGA), and application specific integrated circuits (ASIC). Non-volatile storage may include one or more of a hard disk drive, flash memory, and like devices that may store computer program instructions and data on computer-readable media. Example non-volatile storage devices may include removable storage devices. Memory devices may include one or more volatile memory devices such as but not limited to, random access memory.

Embodiments also may be directed to computer program products comprising software stored on any computer-useable medium. Such software, when executed in one or more data processing devices, cause a data processing device(s) to operate as described herein. Embodiments of the invention may employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

CONCLUSION

The Summary and Abstract sections may set forth one or more but not all exemplary embodiments of the present invention as contemplated by the inventors and are thus not intended to limit the present invention and appended claims in any way. Various embodiments have been described above with the aid of functional building blocks illustrating the implementation of specific features and relationships thereof. The boundaries of these functional building blocks have been arbitrarily defined herein for the convenience of the description. Alternate boundaries can be defined so long as specific functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above described exemplary embodiments.

What is claimed is:

1. A computer implemented system for password pre-verification comprising one or more processors and memory comprising code that when executed causes the one or more processors to:
    (a) translate user input, in the form of a character string that represents a password, to obtain a symbolic representation of the user input; and
    (b) based on the user input, provide output to the user in the form of visual, audio or haptic cues, wherein the visual, audio or haptic cues alert a user as to whether the input character string is correctly or incorrectly entered based upon a variance or similarity of the cue as compared to a previous cue provided to the user during a previous attempt to enter the input character, without providing an objective indicator, that allows an unauthorized user to discover the password, as to whether or not the password has been entered correctly if the user is unfamiliar with the variance, and wherein the output does not change until after a predetermined number of characters has been input and thereafter changes in a distinguishable way with the entry of each successive character that is input.

2. The system of claim 1, wherein the code that when executed causes the one or more processors to translate comprises a hash function to translate user input into a symbolic representation comprising a hash value representative of the user input.

3. The system of claim 1, wherein the code that when executed causes the one or more processors to translate comprises uses a Bloom Filter to translate user input into a symbolic representation of the user input.

4. The system of claim 1, wherein the code further comprises code that when executed causes the one or more processors to receive user input from a physical or on-screen keyboard.

5. The system of claim 1, wherein the code further comprises code that when executed causes the one or more processors to receive user input from a speech-recognition device configured to receive user input that is spoken.

6. The system of claim 1, wherein the code that when executed causes the one or more processors to provide output to the user in form of a sequence of colors determined by the user input character string.

7. The system of claim 1, wherein the code that when executed causes the one or more processors to provide output to the user in the form of a graphical representation, wherein the content of the graphical representation is determined by the user input character string.

8. A computer implemented system for password pre-verification comprising one or more processors and memory comprising code that when executed cause the one or more processors to:
    (a) translate user input, in the form of a character string that can represent a password, to obtain a symbolic representation of the user input;
    (b) compare an existing symbolic representation with the symbolic representation generated from the user input; and
    (c) based on the result of the comparison, provide output to the user, in the form of visual, audio or haptic cues, wherein the visual, audio or haptic cues alert a user as to whether the input character string is correctly or incorrectly entered based upon a variance or similarity of the cue as compared to a previous cue provided to the user during a previous attempt to enter the input character, without providing an objective indicator, that allows an unauthorized user to discover the password, as to whether or not the password has been entered correctly if the user is unfamiliar with the variance, and wherein the output does not change until after a predetermined number of characters has been input and thereafter changes in a distinguishable way with the entry of each successive character that is input.

9. The system of claim 8, wherein the code that when executed causes the one or more processors to translate comprises a hash function configured to translate user input into a symbolic representation.

10. The system of claim 8, wherein the code further comprises code that when executed causes the one or more processors to receive user input from a physical or on-screen keyboard.

11. The system of claim 8, wherein the code further comprises code that when executed causes the one or more processors to receive user input from a speech-recognition device configured to receive user input that is spoken.

12. The system of claim 8, wherein the code that when executed causes the one or more processors to provide output to the user in form of a sequence of colors determined by the user input character string.

13. The system of claim 8, wherein the code that when executed causes the one or more processors to provide output to the user in the form of a graphical representation, wherein the content of the graphical representation is determined by the user input character string.

14. A computer implemented method for password pre-verification comprising:
  (a) executing a translation module on a processor that causes the processor to translate user input, in the form of a character string that can represent a password, to obtain a symbolic representation of the user input;
  (b) executing an output module on the processor that causes the processor to receive the symbolic representation from the translation module and, based on the user input, provide output to the user in the form of visual, audio or haptic cues, wherein the visual, audio or haptic cues alert a user as to whether the input character string is correctly or incorrectly entered based upon a variance or similarity of the cue as compared to a previous cue provided to the user during a previous attempt to enter the input character, without providing an objective indicator, that allows an unauthorized user to discover the password, as to whether or not the password has been entered correctly if the user is unfamiliar with the variance, and wherein the output does not change until after a predetermined number of characters has been input and thereafter changes in a distinguishable way with the entry of each successive character that is input.

15. The method of claim 14, further comprising using a hash function to translate user input into a symbolic representation.

16. The method of claim 14, further comprising executing an input module to receive user input from a physical or on-screen keyboard.

17. The method of claim 14, further comprising executing an input module to receive user input from a speech-recognition device configured to receive user input that is spoken.

18. The method of claim 14, further comprising executing the output module to provide output to the user in form of a sequence of colors determined by the user input character string.

19. The method of claim 14, further comprising executing the output module to provide output to the user in the form of a graphical representation, wherein the content of the graphical representation is determined by the user input character string.

20. A computer implemented method for password pre-verification comprising:
  (a) executing a translation module on a processor that causes the processor to translate user input, in the form of a character string that can represent a password, to obtain a symbolic representation of the user input;
  (b) executing a comparison module on the processor that causes the processor to compare an existing symbolic representation with the symbolic representation generated from the user input by the translation module; and
  (c) executing output module on the processor that causes the processor to receive information from the comparison module and, based on the result of the comparison, to provide output to the user, in the form of visual, audio or haptic cues, wherein the visual, audio or haptic cues alert a user as to whether the input character string is correctly or incorrectly entered based upon a variance or similarity of the cue as compared to a previous cue provided to the user during a previous attempt to enter the input character, without providing an objective indicator, that allows an unauthorized user to discover the password, as to whether or not the password has been entered correctly if the user is unfamiliar with the variance, and wherein the output does not change until after a predetermined number of characters has been input and thereafter changes in a distinguishable way with the entry of each successive character that is input.

21. The method of claim 19 further comprising using a hash function to translate user input into a symbolic representation.

22. The method of claim 19, further comprising using an input module to receive user input from a physical or on-screen keyboard.

23. The method of claim 19, further comprising using an input module to receive user input from a speech-recognition device configured to receive user input that is spoken.

24. The method of claim 19, further comprising using the output module to provide output to the user in form of a sequence of colors determined by the user input character string.

25. The method of claim 19, further comprising using the output module provide output to the user in the form of a graphical representation, wherein the content of the graphical representation is determined by the user input character string.

26. The system of claim 1, wherein the password is an existing password that was set prior to a receipt of the user input.

* * * * *